May 1, 1928.
V. A. FYNN
1,668,273
SYNCHRONOUS MOTOR
Filed Aug. 11, 1926
*Fig. 1.*
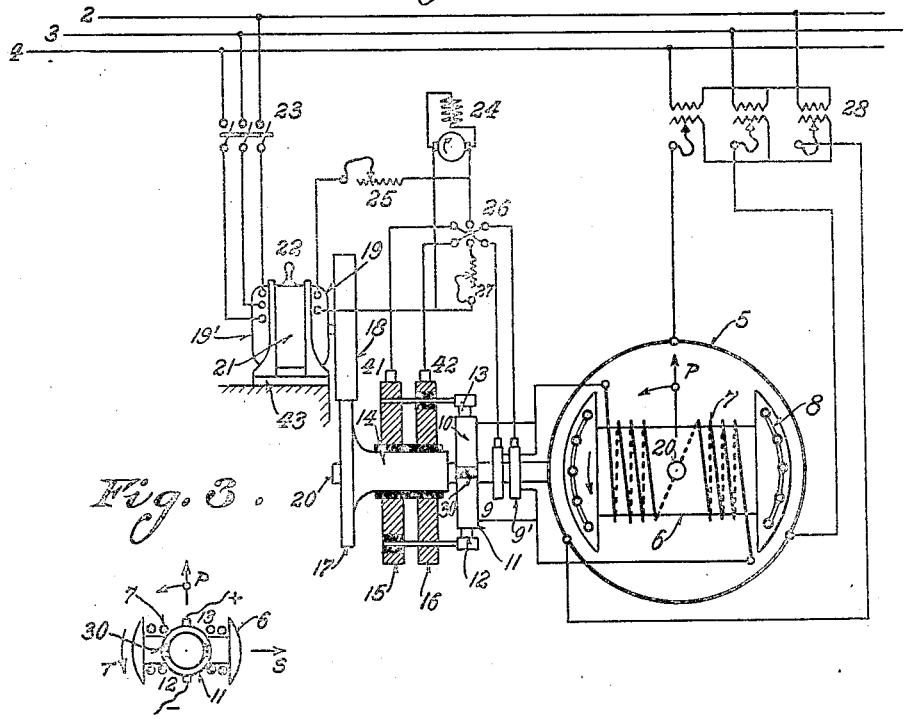
*Fig. 3.*
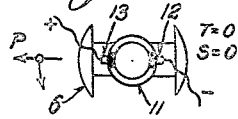
*Fig. 4.*
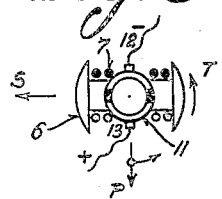
*Fig. 2.*
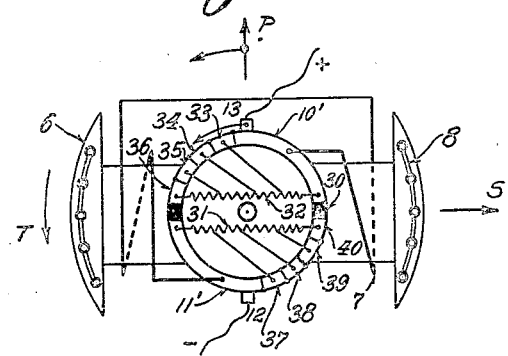
*Fig. 5.*
Inventor:
Valère A. Fynn

Patented May 1, 1928.

1,668,273

UNITED STATES PATENT OFFICE.

VALÈRE A. FYNN, OF ST. LOUIS, MISSOURI.

SYNCHRONOUS MOTOR.

Application filed August 11, 1926. Serial No. 128,562.

My invention relates to synchronous motors and particularly to machines in which a flux revolving synchronously with respect to the primary is produced at sub-synchronous speeds.

It is now known that the synchronizing torque, for instance, of a polyphase synchronous motor of the ordinary construction, depends on the interaction between the flux which revolves synchronously with respect to the primary and the unidirectional current sent into the secondary windings when the motor has reached a speed near the synchronous. It is also known that this synchronizing torque is alternating with equal positive and negative maxima and is of slip frequency.

One of the objects of this invention is to produce an alternating synchronizing torque in which the positive maxima substantially exceed the negative ones and preferably a unidirectional synchronizing torque instead of an alternating one, by reversing the direction of the unidirectional current through the secondary winding of the motor at suitable instants. Another object is to reduce the sparking at the reversing mechanism.

All the objects and features of this invention will appear from the detailed description taken in connection with the accompanying drawings and will be pointed out in the claims.

The drawings diagrammatically illustrate a two-pole embodiment of my invention: Fig. 1 shows a two-pole three-phase motor together with the simplest form of my reversing device and Fig. 2 shows the preferred form of the latter; Figs. 3, 4 and 5 are explanatory diagrams.

Referring to Fig. 1, the primary carries a three-phase winding 5 adapted to be connected to the supply 2, 3, 4 by means of the adjustable ratio three-phase transformer 28. The secondary 6 is mounted on the shaft 20 and has pronounced polar projections provided with sections 8 of a squirrel cage. This secondary also carries a winding 7 connected in the usual way to sliprings 9 and 9' insulatingly carried by the shaft 20. This winding 7 is, however, also connected to a reversing commutator, the sections 10, 11 of which are separated by oppositely located insulating strips 30. This reversing device is also insulatingly carried by the shaft 20 and so located thereon that the axis of the insulating segments 30 coincides with the axis of the secondary winding 7 or with the axis of the unidirectional magnetization produced by the conduced ampere-turns on the secondary. In the case of a machine with pronounced polar projections, such as shown in Figure 1, the axis of the insulating segments 30 usually also coincides, or nearly so, with the mechanical axis of the pronounced polar projections. A sleeve 14 integral with a gear wheel 17 is driven, when in use, by the auxiliary synchronous motor 21 through the pinion 18. The sleeve 14 is adapted to revolve freely about the shaft 20 and insulatingly carries two sliprings 15, 16 with which cooperate the stationary brushes 41, 42. The slipring 15 conductively carries the brush 13 and the slipring 16 conductively carries the brush 12. These brushes cooperate with the reversing device 10, 11. The direct current generator 24 is driven in any desired manner and through the two-pole, two-throw switch 26 is adapted to be connected either directly to the sliprings 9, 9' by way of stationary brushes cooperating with same or, when thrown to the left, with the stationary brushes 41, 42 cooperating with the sliprings 15, 16. This generator can also be connected to the secondary member of the auxiliary polyphase motor 21 through the adjustable resistance 25. The adjustable resistance 27 is in circuit with the D. C. generator, whether the switch 26 is thrown to the left or to the right. The primary of the auxiliary polyphase synchronous motor 21 is adapted to be connected to the supply through the switch 23 and its primary member can be displaced circumferentially by means of the handle 22 and, of course, without interrupting the primary circuits. To this end this primary is rotatably held in the end plates 19, 19' to which the feet of the motor are attached, said feet being rigidly bolted to a bed plate 43.

The preferred arrangement of the reversing device 10, 11 is shown in Fig. 2 for the reason that no way could be seen in clearly showing this form of the device in Fig. 1. In Fig. 2, each conductive half or section of the reversing device consists of a plurality of segments or divisions interconnected by the resistances 31 and 32 respectively. Thus, the upper half or section 10 of the reversing device, the one shown in contact with the brush 13 in Fig. 2, consists of a division 10' spanning about 90 degrees and of a series of much smaller divisions or segment 33, 34, 35 and 36 circumferentially insulated from the segment 10' but connected thereto through one or more parts of the resistance 32. Similarly, the lower half or section 11 of the reversing device, that shown in contact with the brush 12, comprises a large segment 11' and four small segments 37, 38, 39 and 40 circumferentially insulated from 11' but connected to the latter through one or more parts of the resistance 31. The ends of the winding 7 are connected to the segments 10' and 11' respectively.

The mode of operation will be first described on the assumption that the reversing device merely consists of two sections 10, 11, each spanning somewhat less than 180 degrees and circumferentially insulated one from the other by means of the insulating segments 30, as more clearly shown in the explanatory diagrams 3, 4 and 5. Before starting the motor, it is preferred to open the switch 26, or, better still, to move the brushes 12, 13 out of contact with the reversing commutator, thus disconnecting the D. C. generator 24 from the winding 7 and to connect the primary 5 to the supply 2, 3, 4 through the adjustable ratio three-phase transformer 28, increasing the terminal voltage as the motor gathers speed. When the primary 5 is connected to the supply said primary immediately produces a primary revolving flux P which revolves synchronously with respect to 5, say in a counter-clockwise direction. This primary flux generates induction-motor-torque producing currents in the squirrel cage 8 or its equivalent and causes the machine to reach a speed which is very close to the synchronous, the secondary member 6 revolving in the same direction in which the primary flux P revolves. In order to synchronize this machine with a strictly unidirectional synchronizing torque, it is necessary to cause the brushes 12, 13, which are displaced by 180 electrical degrees, to revolve synchronously and codirectionally with the primary flux P of the motor and with the axis of the brushes 12, 13 constantly coinciding with the axis of P or not departing from said axis to any material extent. In order to achieve this, after the motor has reached a nearly synchronous speed, the auxiliary motor 21 is started by closing the switch 23 and brought up to synchronism by closing its unidirectional exciting circuit at 25. The brushes 12, 13 now revolve synchronously with P and also unidirectionally with same, provided the auxiliary 21 is connected to revolve in the right direction, but the axis of said brushes may not, and probably will not, be coaxial with that of P. In order to bring these two synchronously revolving axes into coincidence the primary of the auxiliary motor 21 is adapted to be displaced in the one or the other direction by means of the handle 22. Minor adjustments can be made by changing the magnitude of the unidirectional magnetization on the secondary of the auxiliary 21 by means of the adjustable resistance 25 but this procedure may cause the auxiliary motor to fall out of step unless the machine is unduly large and may adversely influence the power factor of the auxiliary motor. One way of making sure that the axis of the brushes 12, 13 is substantially coaxial with that of P is to connect a voltmeter across the sliprings 9, 9' and to make sure that the brushes 12, 13 pass over the insulating segments 30 when the voltmeter shows zero volts. This voltmeter must, of course, be adapted to indicate the slowly alternating voltage generated in 7 by P. Near synchronism the difference in speed between P and 7 is very small and the voltage generated in 7 is of slip frequency. Another indication as to the coaxiality in question can be gleaned by temporarily shortcircuiting the brushes 41, 42 and adjusting the stator of 21 until there is no sparking at the brushes 12, 13. Sparking at these brushes will cease entirely when they ride over the insulating segments 30 at the time when P is coaxial with the winding 7. After the brushes 12, 13 have been brought into the desired relative position with respect to the axis of P, the brushes 12, 13 are moved into contact with the reversing device, the switch 26 is thrown to the left, and unidirectional current derived from 24 is sent into the winding 7. After synchronization switch 26 is sharply thrown to the right and switches 23 and 25 are opened.

In order to show how the strictly unidirectional synchronizing torque is produced under the conditions named, reference will be had to the explanatory Figs. 3, 4 and 5. With the brushes 12, 13 running synchronously and coaxially with P and picking out the instant in which the axis of P as well as that of the brushes 12, 13 is perpendicular to the axis of 7 and P is directed upwardly, as in Fig. 3, then, in order to produce a positive synchronizing torque T, it is necessary that the source of unidirectional current 24 be so connected to the brushes 12, 13 that 13 is positive and the secondary magnetization S produced by 7 is directed from left to right. This calls for the conductors on the lower side of 6 to carry current directed downwardly, through the plane of the paper, as indicated by dots, and that the conductors on the upper side of 6 carry current directed upwardly, through the plane of the paper, as indicated by circles. In Figs. 3, 4 and 5, it is assumed that the secondary 6 is stationary in space and that P revolves counterclockwise at slip speed which, of course, is the same as when P revolves counterclockwise at synchronous speed and 6 revolves in the same direction at synchronous less slip speed. It is now seen from Fig. 3 that so soon as brush 12 comes into contact with the section 11 and the brush 13 with the section 10, the secondary 6 is magnetized as indicated by the arrow S, the magnetization rising rapidly to its maximum value and remaining at that value until 13 breaks connection with 10 and 12 with 11. The magnitude of the torque T depends on the magnitude of S and on that component of P which is perpendicular to S and directed upwardly. For this reason the torque T will rise more slowly than the magnetization S, will reach a maximum for the position of the brushes shown in Fig. 3 and then decrease more slowly than it rose to become zero when P reaches the position shown in Fig. 4. In this position the torque T is zero, not only because there is no current in 7 since 12 and 13 now ride on the insulating segments 30, but also because P is coaxial with 7 and could not cooperate to produce any torque with 7, even if 7 did carry current at that time. As the rotation of P and of the brushes 12, 13 continues, 13 comes into contact with 11, and 12 comes into contact with 10, thus reversing the current through 7 and bringing about the current distribution in that winding shown in Fig. 5. But, while the current in 7 has been reversed, magnetizing 6 from right to left as indicated by S, the synchronizing torque T remains unchanged as to direction for the reason that P is now directed downwardly instead of upwardly as in Fig. 3. The current in 7 is reversed twice for each complete revolution of P or twice in each complete slip cycle or period. It is thus seen how a strictly unidirectional and pulsating synchronizing torque is secured when the arrangements here disclosed are adjusted and used in the manner here described.

It will be readily understood that interrupting the current flowing through the secondary 7 at the brushes 12, 13 when the latter pass over to the insulating segments 30 cannot be achieved without sparking owing to the very considerable self induction associated with such a winding. In order to reduce this sparking as much as possible it is preferred to begin reducing the current in 7 about the time when the maximum synchronizing torque has been reached, and one way of accomplishing this is shown in Fig. 2. Here again it is assumed that the secondary 6 is stationary and that P, together with the brushes 12, 13, revolves at slip frequency in a counterclockwise direction. When the said brushes passing over the insulating segments 30 first make contact with the segments 10' and 11' of the sections 10 and 11 respectively, no sparking is to be expected, and as the brushes continue to move towards the position which they occupy in Fig. 2 the current through 7 rises rapidly, held back only by the self induction of 7, and at speeds very near the synchronous will certainly reach its maximum value, or practically so, even before the brushes come to occupy the position shown in Fig. 2 and in which P is most effective in so far as synchronizing torque production is concerned. As the brushes continue to travel counterclockwise, brush 13 rides over segment 33 and the brush 12 over segment 37 thereby inserting in the circuit of 7 that part of the resistance 32 which is located between the segments 10' and 33 and that part of the resistance 31 which is located between the segments 11' and 37. When brush 13 rides segment 36 and brush 12 rides segment 40, then the whole of the resistance 32 and the whole of the resistance 31 are in circuit with 7 and with the generator 24. This condition prevails at the time when brush 12 slips off 40 and brush 13 slips off 36, thus interrupting the circuit of 7 prior to reconnecting same to the source in reverse order or, in other words, prior to reversing the current through 7. Under these conditions the drooping part of the synchronizing torque curve, which is of little use from the point of view of synchronizing, is made to droop faster and the sparking at the reversing device is reduced.

Should the axis of the brushes 12, 13 depart materially from the axis of P then the synchronizing torque will not be strictly unidirectional and can be described as an alternating torque with unequal positive and negative maxima. If synchronization is attempted at a time when the axis of 12, 13 is displaced by substantially 90 degrees from the axis of P then the synchronizing torque may be described as an alternating torque. It certainly has equal positive and negative maxima, changes very abruptly from one to the other maximum and does not fall within the scope of this invention which has reference preferably to the production of a strictly unidirectional synchronizing torque, and secondarily to a synchronizing torque which varies in sign but whose positive maxima exceed its negative maxima.

Generally speaking, if the connections between the source 24 and the winding 7 are reversed at the instant when the primary poles are in the axis of P, and the secondary poles are displaced by 90 electrical degrees from the primary poles, then the result is an alternating synchronizing torque with about equal positive and negative maxima and of a very undesirable configuration. When said connections are reversed at the time when primary and secondary poles are coaxial, the result is a unidirectional and pulsating synchronizing torque. I, therefore, aim to so make my adjustments that the connections in question are reversed when the axis of the primary poles or of the primary flux is materially displaced from the perpendicular to the axis of the secondary winding or the axis of the secondary poles, and preferably when the axes of the two sets of poles coincide, i. e., when the axis of the revolving flux coincides with the axis of the secondary winding.

In case the motor has more than two poles and in case the connections between the source and the winding on the secondary are to be reversed by a reversing commutator mounted on the shaft of said motor, as in Figs. 1 or 2, then said commutator must have as many sections as the motor has poles. Alternate sections are then connected to one end of the winding on the secondary and the remaining sections to the other end of said winding. In case each section has a plurality of segments, as in Fig. 2, then the resistance 31 can serve for one set of interconnected sections and the resistance 32 can serve for the other set of interconnected sections. When the motor has more than two poles the brushes cooperating with the reversing commutator must be so displaced that when one brush, or one line of brushes, comes into contact with any one of a set of interconnected reversing commutator sections, the other brush, or line of brushes, comes into contact with the other set of interconnected sections. Said brushes must be displaced by 180 electrical degrees or by an equivalent angle. Thus, for a two pole motor the brushes 12, 13 are displaced by 180 degrees, for a four pole motor by 90 degrees, for a six pole motor by 60 or 180 mechanical degrees, and so on.

The invention is applicable to machines with or without distinct polar projections and whether the primary is located on the stationary or on the revolving member.

In Fig. 1 the main and the auxiliary motors for both two-pole machine, for this reason the pitch diameters of the gear wheels 17, 18 are equal; as a rule, the main motor will have more poles than the auxiliary motor, in which case the gear ratio must be changed accordingly. For a pole ratio of 10 to 2 the pitch diameter of 17 must be five times that of 18.

It will be clear that various changes may be made in the details of this disclosure without departing from the spirit of this invention, and it is, therefore, to be understood that this invention is not to be limited to the specific details here shown and described.

What I claim is:

1. A synchronous motor having a primary and a secondary, means adapted to produce at sub-synchronous speeds a flux revolving synchronously with respect to the primary, magnetizing means on the secondary, a source of unidirectional current, connections between said source and the magnetizing means on the secondary, and means operative at sub-synchronous speeds for reversing the connections between the source and said secondary magnetizing means twice for each complete cycle of the motor slip frequency and at a time when the axis of the synchronously revolving flux is materially displaced from the perpendicular to the axis of the magnetization produced by currents conduced into said magnetizing means on the secondary.

2. A synchronous motor having a primary and a secondary, means adapted to produce at sub-synchronous speeds a flux revolving synchronously with respect to the primary, magnetizing means on the secondary, a source of unidirectional current, connections between said source and the magnetizing means on the secondary, and means operative at sub-synchronous speeds for reversing the connections between the source and said secondary magnetizing means twice for each complete cycle of the motor slip frequency and at a time when the axis of the synchronously revolving flux approximately coincides with the axis of the magnetizations produced by currents conduced into said magnetizing means on the secondary.

3. A synchronous motor having a primary and a secondary, means adapted to produce at sub-synchronous speeds a flux revolving synchronously with respect to the primary, a winding on the secondary, a source of unidirectional current, connections between said source and the winding on the secondary, means operative at sub-synchronous speeds for reversing the connections between the source and said secondary winding twice for each complete cycle of the motor slip frequency and at a time when the axis of the synchronously revolving flux is materially displaced from the perpendicular to the axis of the winding on the secondary, and means operative while the reversing means are in operation for adjusting the instant at which the connections between the source and the secondary winding are reversed with reference to the position of the axis of the revolving field relative to the axis of said secondary winding.

4. A synchronous motor having a primary and a secondary, means adapted to produce at sub-synchronous speeds a flux revolving synchronously with respect to the primary, a winding on the secondary, a source of unidirectional current, a commutator mounted on the secondary and having two sections displaced by 180 electrical degrees, one section being connected to one end of the secondary winding and the other section being connected to the other end of said winding, insulating means between said sections located along an axis displaced from the perpendicular to the axis of the winding on the secondary, brushes cooperating with the commutator and connected to said source, said brushes being displaced by 180 electrical degrees, and an auxiliary synchronous motor adapted to drive said brushes synchronously and codirectionally with the revolving flux, the axis of the brushes being displaced from the perpendicular to the axis of the revolving flux.

5. A synchronous motor having a primary and a secondary, means adapted to produce at sub-synchronous speeds a flux revolving synchronously with respect to the primary, a winding on the secondary, a source of unidirectional current, a commutator mounted on the secondary and having two sections displaced by 180 electrical degrees, one section being connected to one end of the secondary winding and the other section being connected to the other end of said winding, insulating means between said sections located along an axis displaced from the perpendicular to the axis of the winding on the secondary, brushes cooperating with the commutator and connected to said source, said brushes being displaced by 180 electrical degrees, and an auxiliary synchronous motor adapted to drive said brushes synchronously and codirectionally with the revolving flux, the axis of the brushes approximately coinciding with the axis of the revolving flux.

6. A synchronous motor having a primary and a secondary, means adapted to produce at sub-synchronous speeds a flux revolving synchronously with respect to the primary, a winding on the secondary, a source of unidirectional current, a commutator mounted on the secondary and having two sections displaced by 180 electrical degrees, one section being connected to one end of the secondary winding and the other section being connected to the other end of said winding, alternate halves of each section of the commutator comprising a plurality of segments, insulating means between said sections located approximately in the axis of the winding on the secondary, and resistance between the several segments of each section.

7. A synchronous motor having a primary and a secondary, means adapted to produce at sub-synchronous speeds a flux revolving synchronously with respect to the primary, a winding on the secondary, a source of unidirectional current, connections between said source and the winding on the secondary, and means operative at sub-synchronous speeds for reversing the connections between the source and said secondary winding adjusted to produce a unidirectional synchronizing torque by the interaction of the primary revolving flux and the secondary magnetization produced by the currents derived from said source.

In testimony whereof I affix my signature this 6th day of August, 1926.

VALÈRE A. FYNN.